UNITED STATES PATENT OFFICE.

MAX EHRLICH AND CARL STORCK, OF FRANKFORT-ON-THE-MAIN, PRUSSIA, GERMANY.

METHOD OF PRINTING GOLD, SILVER, OR PLATINUM DECORATIONS ON CERAMIC WARE.

SPECIFICATION forming part of Letters Patent No. 391,036, dated October 16, 1888.

Application filed December 27, 1887. Serial No. 259,127. (No specimens.)

*To all whom it may concern:*

Be it known that we, MAX EHRLICH and CARL STORCK, both subjects of the King of Prussia, German Emperor, residing at Frankfort-on-the-Main, in the Empire of Germany, have invented certain new and useful Improvements in the Method of Printing Gold, Silver, or Platinum Decorations on Ceramic Articles, of which the following is a complete specification.

Decorations in gold, silver, and platinum on pottery and similar articles have heretofore been made by applying the merchantable liquid gold composition to the ceramic ware by means of a feather or brush. The exact proportion of the substances which this liquid is composed of and the process by which it is produced are not known, as it is kept secret by some laboratories for refining metals, which, however, sell this liquid composition everywhere. After having applied the liquid to the article, the latter was burned in an oven or muffle. As previously stated, the decorations have heretofore been made with a brush or feather; but if we desire to paint any design, letters, or the like in metalliferous colors on the article, it will be necessary to use, for instance, a gold composition which is not so liquid as that described above, and, moreover, the china must beforehand be treated or coated with a lac or varnish, so that the tough gold composition, which can only be used for printing, will stick firmly to it.

The gold composition used for printing purposes may be obtained by the process which is described in our application filed July 18, 1887, Serial No. 244,640, and which, for a better understanding of our invention, we shall recapitulate in short terms, viz: We take the merchantable liquid gold composition and precipitate, by means of ether, the sulphuret of gold chemically combined with balsam of sulphur contained in the composition. We gain a compound in the form of dust. This compound we dissolve in nitro-benzole and receive a tough and gluey composition suitable to be used as a printing-color.

Before applying the printing-color to the article by the well-known ways of printing, reprinting, or dusting, the article which is to be ornamented must be coated with a lac or varnish, so that the golden printing-color may stick to the ceramic article; but the lacs generally employed in producing decorations on ceramic articles cannot be used in this case, as all these compositions do not burn up without leaving ashes; but this is the chief requirement of a lac for golden decorations on ceramic articles, since otherwise the golden decorations, when burned, will show blue or red margins; hence it is absolutely necessary to use a lac or varnish which burns up without leaving ashes and has great adhesive capacities. It also must dry very fast.

For producing the lac we proceed as follows: We take a volatile oil—such as turpentine or lavender oil, or the products of oxidation of these that are resins, or a fat oil, such as linseed-oil or its products of oxidation—and treat it with sulphur in presence of heat. After this has been finished, we put to it again a volatile oil, such as turpentine-oil or carburet of sulphur, ether, acetone, or other media which dissolve resin and evaporate at the same time without residue. This lac we apply to the pottery in an extremely thin coat, and before getting dry we lay albumenized paper, upon which the golden decoration has been printed, upon the pottery surface, so that the gold decoration may stick on it, because it has been treated with the above-described lac. We subsequently wash off this albumenized paper, whereby only the gold decoration remains on the article. When dried, the pottery is burned and shows the gold decoration in a bright color. In the same manner printed silver or platinum decorations can be produced on pottery. In the following an example of the fabrication and application of this lac shall be given:

Seven thousand eight hundred and sixty-five kilograms Venetian turpentine-oil are mixed with two thousand one hundred and thirty-five kilograms sulphur and heated by stirring up continually during two hours unto 200° centigrade. If a drop of this material so obtained is dripped on a glass plate, it must after cooling be of a brown transparent color. To every one kilogram of this material, being composed of balsam of sulphur, five kilograms turpentine-oil are added, whereby this balsam is dissolved into a clear brown liquor, which can be purified by means of filtration. This lac is then applied to the ceramic article very thinly. As long as it is glutinous it is able to keep the reprinting picture (mock-leaf golden ornament) which is on the glair paper on the ceramic article. The paper having been washed off in water, the mock-leaf golden ornament remains on the ceramic article, and is then burned in a muffle.

The volatile or fat oils which we preferably use for the production of our lac are the following: turpentine-oil, lavender-oil, and poppy-seed oil. The products of oxidation of these which we use likewise for the same purpose are, viz: Venetian turpentine, French turpentine, pine or fir resins, and other resins derived from plants.

The dissolving media which we preferably use for the production of our lac are ether, carburet of sulphur, alcohol, turpentine-oil, lavender-oil, &c.

The albumenized paper which we preferably use for the printing process must be made of white of eggs, which is as free from salts and ashes as possible, and we use especially such paper that has been coated with dialyzed white of eggs. Should we, however, employ the common albumenized paper as it is brought to the market, it is necessary to make its injurious properties innoxious by coating it with a solution of one per cent. collodion, caoutchouc, or gutta-percha, or similar dissolving matters. By washing the albumenized paper off from the china all its salts, &c., will also be taken away.

Having now fully described and set forth the nature of our invention, what we claim is—

1. The method of producing decorations on pottery and other articles, which consists in first applying to the article a lac which will burn up without ashes, then printing a gold, silver, or platinum color upon it before it gets dry, and finally burning the article in a muffle or oven, as and for the purpose described.

2. The method of producing decorations in gold, silver, or platinum on pottery and other articles, which consists in first coating the article with a lac which is free from all ashes when burned, applying the decoration of gold, silver, or platinum to the article by way of reprinting from albumenized paper coated with dialyzed white of eggs, then washing off the paper, and finally burning the article in a muffle or oven, as and for the purpose described.

3. The method of producing decorations in gold, silver, or platinum on pottery and other articles, which consists in first coating the article with a lac which is free from all ashes when burned, then applying the decorations of gold, silver, or platinum to the article by way of reprinting from albumenized paper coated with collodion, caoutchouc, or gutta-percha, then washing off the paper, and finally burning the article in a muffle or oven, as and for the purpose described.

4. The method of producing decorations in gold, silver, or platinum on pottery and other articles, which consists in first coating the article with a lac obtained by treating volatile or fat oils or their products of oxidation with sulphur in presence of heat and subsequently dissolving this compound in volatile or fat oils or similar resin-dissolving media, then applying the decoration of gold, silver, or platinum to the article by way of printing or reprinting, and finally burning the article in a muffle or oven, as and for the purpose described.

In witness whereof we have hereunto set our hands in presence of two witnesses.

MAX EHRLICH.
CARL STORCK.

Witnesses:
ALVESTO S. HOGUE,
JEAN GRUND.